United States Patent
Fröberg Olsson et al.

(10) Patent No.: US 11,271,687 B2
(45) Date of Patent: Mar. 8, 2022

(54) METHOD AND ARRANGEMENT FOR ENHANCED SOFT BUFFER HANDLING

(71) Applicant: Telefonaktiebolaget LM Ericsson (publ), Stockholm (SE)

(72) Inventors: Jonas Fröberg Olsson, Ljungsbro (SE); Alexey Shapin, Luleå (SE); Gustav Wikström, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 31 days.

(21) Appl. No.: 16/761,283

(22) PCT Filed: Nov. 15, 2018

(86) PCT No.: PCT/SE2018/051181
§ 371 (c)(1),
(2) Date: May 4, 2020

(87) PCT Pub. No.: WO2019/098929
PCT Pub. Date: May 23, 2019

(65) Prior Publication Data
US 2021/0194640 A1   Jun. 24, 2021

Related U.S. Application Data

(60) Provisional application No. 62/587,669, filed on Nov. 17, 2017.

(51) Int. Cl.
*H04L 1/18* (2006.01)

(52) U.S. Cl.
CPC .......... *H04L 1/1835* (2013.01); *H04L 1/1819* (2013.01)

(58) Field of Classification Search
CPC ... H04L 1/1835; H04L 1/1819; H04L 1/1816; H04L 1/1829; H04L 1/1832; H04L 1/1845; H04L 1/1858
See application file for complete search history.

(56) References Cited

U.S. PATENT DOCUMENTS

| | | | |
|---|---|---|---|
| 2007/0079207 A1* | 4/2007 | Seidel | H04L 1/1845 714/748 |
| 2010/0146357 A1* | 6/2010 | Larsson | H04L 5/0044 714/750 |
| 2020/0337073 A1* | 10/2020 | Papasakellariou | H04W 72/1268 |

FOREIGN PATENT DOCUMENTS

WO   2017 069676 A1   4/2017

OTHER PUBLICATIONS

3GPP TSG RAN WG1 Meeting NR#3; Nagoya, Japan; Source: Sequans Communications; Title: On remaining aspects for preemption-based data multiplexing (R1-1716617)—Sep. 18-21, 2017.
3GPP TSG RAN WG1 Meeting #90bis; Prague, Czech Republic; Source: Huawei, HiSilicon; Title: On pre-emption indication for DL multiplexing of URLLC and eMBB (R1-1717081)—Oct. 9-13, 2017.

(Continued)

*Primary Examiner* — Christine T. Tu
(74) *Attorney, Agent, or Firm* — Baker Botts, LLP

(57) ABSTRACT

In a method for soft buffer handling in a user equipment in a wireless communication system, performing the steps of receiving (S100) a transmission, identifying (S101) overlapping positions for non-zero soft values in a soft buffer and received transmission soft values, copying and storing (S102) identified overlapping non-zero soft values or received transmission soft values, and combining (S103) soft buffer with received transmission.

18 Claims, 11 Drawing Sheets

(56) References Cited

OTHER PUBLICATIONS

3GPP TSG RAN WG1 Meeting #90bis; Prague, CZ; Source: China Telecom; Title: Remaining issues on CBG-based (re)transmission (R1-1718672)—Oct. 9-13, 2017.
PCT International Search Report for International application No. PCT/SE2018/051181—dated Feb. 19, 2019.
PCT Written Opinion of the International Searching Authority for International application No. PCT/SE2018/051181—dated Feb. 19, 2019.

* cited by examiner

METHOD AND ARRANGEMENT FOR ENHANCED SOFT BUFFER HANDLING

PRIORITY

This nonprovisional application is a U.S. National Stage Filing under 35 U.S.C. § 371 of International Patent Application Serial No. PCT/SE2018/051181 filed Nov. 15, 2018 and entitled "Method and Arrangement for Enhanced Soft Buffer Handling" which claims priority to U.S. Provisional Patent Application No. 62/587,669 filed Nov. 17, 2017 both of which are hereby incorporated by reference in their entirety.

TECHNICAL FIELD

The proposed technology generally relates wireless communication systems, and more specifically to soft buffer handling in user equipment in such systems.

BACKGROUND

In many wireless communication systems so called HARQ (Hybrid Automatic Repeat Request) re-transmissions is a method to mitigate un-predictable interference and channel variations. For downlink, when a wireless device such as a user equipment, attempts to decode a received data message it transmits an indicator to the transmitter e.g. in a network node, indicating whether the decoding was successful or not. When the transmitter receives an indicator indicating un-successful decoding, the transmitter typically performs a re-transmission of the data message which the receiver e.g. in the wireless device will typically combine with the originally received transmission. The combining is known as soft combining, where Chase and incremental redundancy are two well-known variants. The combining greatly increase the probability of successful decoding.

When a wireless device receives a new transmission, the soft buffer is cleared (set to zero) before soft bits are added to the soft buffer. The soft buffer can be viewed as a set or array of soft-values where each soft-value corresponds to an entry in a parent code word. A transmission corresponds to a transmission of a selected set of bits in the parent code word and where different redundancy versions corresponds to a different set of bits in the parent code word. When a re-transmission is received the received soft-bits from the re-transmission are combined with the corresponding soft-bits in the soft buffer, as indicated in FIG. 1.

The first set of soft-buffer soft bits may be viewed as an indexed set $S=\{s_0, s_1, \ldots, s_{N-1}\}$ and the set of received soft bits can be viewed as a set $R=\{r_{j_0}, r_{j_1}, \ldots, r_{j_{P-1}}\}$ where P is the number of received soft bits. The combining of received soft bits and the first set of soft-buffer bits is typically performed by the adding the values for indices $j_0, j_1, \ldots, j_{P-1}$, i.e. $s_k+r_k$ for $k=j_0, j_1, \ldots, j_{P-1}$, while not affecting values for other indices in S. For every re-transmission the soft bits are combined with soft bits for the current received transmission before decoding.

In LTE the indicator indicating the result of a decoding attempt is known as a HARQ-ACK. For LTE up to two transport blocks (two data messages) may be transmitted in each TTI (Transmission Time Interval) which mean that the HARQ-ACK may consist of 2 bits, where each bit indicates success or un-success of a respective transport block.

LTE is the latest standard in 3GPP family of wireless systems and highly optimized for MBB (Mobile Broad-Band) traffic. The TTI (subframe) has 1 ms duration and the HARQ-ACK is, for FDD, transmitted in subframe n+4 for a data transmission in subframe n.

So-called URLLC (Ultra-Reliable Low Latency Communication) is data service with extremely strict error and latency requirements. Error probabilities as low as $10^{-5}$ or lower and 1 ms end-to-end latency or lower are expected requirements.

5G is currently being studied by 3GPP and is targeting a wide range of data services including MBB and URLLC. To enable optimized service the length of TTI are expected to be different for different services, where URLLC may have a shorter TTI length compared to MBB. It may then happen that MBB transmission may be occurring when a URLLC data packet arrive to the transmitter. It may therefore be desirable to blank (interrupt) the MBB transmission is certain time-frequency resources and perform a ULLRC transmission on those resources. This has the drawback that the wireless device receiving the (partial) MBB will with high probability fail the decoding. This may be solved by performing HARQ re-transmissions, but since the soft-buffer is partly corrupt (for the resource where the first transmission was blanked) a larger number of HARQ re-transmissions is required for correct decoding than if the wireless device was aware of the resource blanked by the transmitter.

3GPP has agreed that a re-transmission may be comprise only a subset of Code Block Groups (CBGs) and that a so called flush indicator CBGFI may indicate handling of soft-buffer handling. At RAN1 #90 meeting, the following agreements related to CBG-based (re)transmission were approved:

Agreements:
  For the purpose of further discussion, we conclude following:
    For the following discussion on CBG-based retransmission, define the terms CBGTI and CBGFI as below.
      CBGTI (CBG transmission information) means information on which CBG(s) is/are (re)transmitted and,
      CBGFI (CBG flushing out information) means information on which CBG(s) is/are handled differently for soft-buffer/HARQ combining
  At least following is supported for DL CBG-based (re) transmission.
    A DCI includes both CBGTI and CBGFI.
      For single CW case, when N is the maximum number of CBGs configured by RRC
        N bits for CBGTI, and the other 1 bit for CBGFI
          FFS: whether re-interpret NDI as CBGFI
          FFS: whether CBGTI is re-interpreted as NDI
          FFS: whether jointly using other field as CBGTI or CBGFI
      FFS on multiple CW case.
  At least following is supported for DL and UL CBG-based (re)transmission.
    A DCI includes CBGTI.
      For single CW case, N bits for CBGTI as configured by RRC
        FFS: whether CBGTI is re-interpreted as NDI
        FFS: whether NDI is re-interpreted as CBGTI
        FFS: whether jointly using other field as CBGTI
      FFS on multiple CW case 3GPP has also agreed that that a UE can be configured to monitor a group common DCI (Downlink Control Information) for Pre-emption Indication (PI) wherein the pre-emption indication may indicate time-frequency resources subject to pre-emption. The following was agreed at RAN1 #90 meeting Agreements:
 Preempted resource(s) within a certain time/frequency region (i.e. reference downlink resource) within the periodicity to monitor group common DCI for pre-emption indication, is indicated by the group common DCI carrying the preemption indication
  The frequency region of the reference downlink resource is configured semi-statically
   FFS: explicit signaling or implicitly derived by other RRC signalling
  The time region of the reference downlink resource is configured semi-statically
   FFS: explicit signaling or implicitly derived by other RRC signalling
 The frequency granularity of pre-emption indication is configured to be y RBs within the reference downlink resource for the given numerology
  FFS: explicit signaling or implicitly derived by other RRC signalling
  Note: The y RBs can correspond to the whole frequency region of the downlink reference resource.
 The time granularity of pre-emption indication is configured to be x symbols within the reference downlink resource for the given numerology
  FFS: explicit signaling or implicitly derived by other RRC signalling
  Note: Time/frequency granularities of pre-emption indication should take into account the payload size of the group common DCI carrying the pre-emption indication There currently exist certain challenge(s). 3GPP has not yet agreed on a UE handling for CBGFI and PI, but CBGFI is a UE-specific indication while PI is UE-group specific indication and they seem to be regarded as independent mechanisms, wherein reception of either CBGFI or PI results in that UE flushes or resets the soft values for soft bits indicated. This means that if UE receives an initial transmission which is not pre-empted and then receives a buffer management algorithm the UE flushes all indicated soft bits even if these soft values were already combined with the initial transmission which was not corrupted.

Furthermore, if the group-common PI is used together with MU-MIMO scheduling, the current solution is not optimal. When gNB has a lot of antennas, a narrow beaming can be direct to each individual UE which means that only UEs with beams "close" to the beam of a URLLC UE will be affected by pre-emption. Hence, depending on which URLLC UE causes a pre-emption, different groups of eMBB UEs need to be informed about pre-emption.

Consequently, there is a need for solutions that mitigate the above described soft-buffer issues.

SUMMARY

Certain aspects of the present disclosure and their embodiments may provide solutions to these or other challenges. The disclosure covers methods of soft-buffer handling, and especially when a UE is configured to receive a code block group flush indicator and/or pre-emption indication message This and other objects are met by embodiments of the proposed technology.

According to a first aspect, there is provided a method for soft buffer handling in a user equipment in a wireless communication system, which method includes receiving a transmission, and identifying overlapping positions for non-zero soft values in a soft buffer and received transmission soft values. Further, the method includes copying and storing identified overlapping non-zero soft values or received transmission soft values and combining soft buffer with received transmission.

According to a second aspect, there is provided a wireless device for soft-buffer handling, the wireless device being configured to receive a transmission, and to identify overlapping positions for non-zero soft values in a soft buffer and received transmission soft values. Further, the wireless device is configured to copy, and store identified overlapping non-zero soft values or received transmission soft values, and to combine soft buffer with received transmission.

Further aspects provide a computer program for performing the method, and a carrier for carrying the computer program. An advantage of the proposed technology is improved soft buffer handling in a wireless device, especially when pre-emption is utilized in a wireless communication system.

Other advantages will be appreciated when reading the detailed description.

BRIEF DESCRIPTION OF THE DRAWINGS

The embodiments, together with further objects and advantages thereof, may best be understood by referring to the following description taken together with the accompanying drawings, in which.

ABBREVIATIONS

Figure 1:
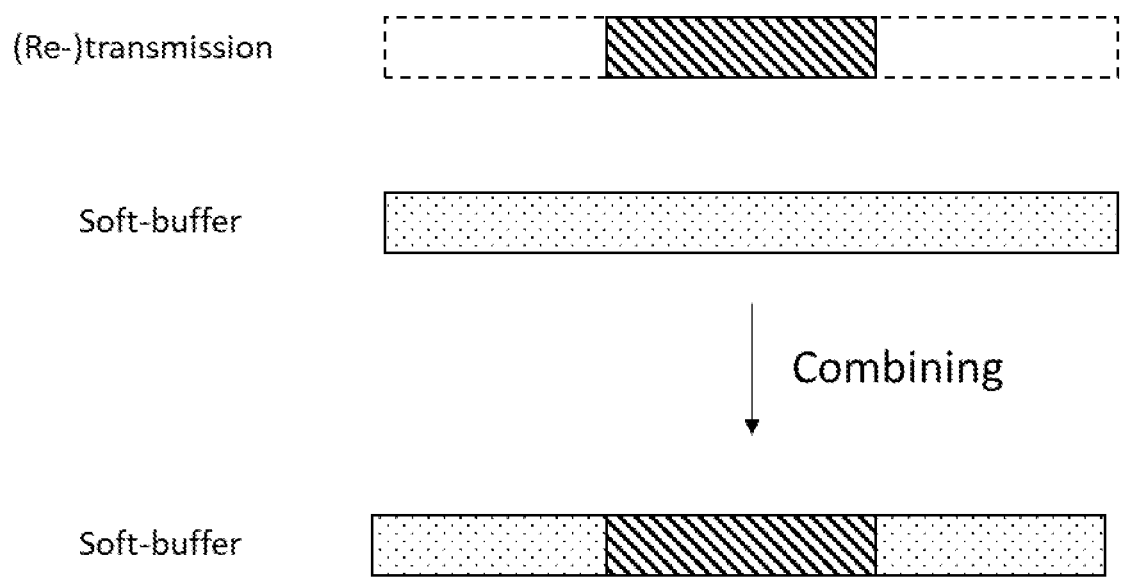
FIG. 1 illustrates the concept of soft combining.

At least some of the following abbreviations may be used in this disclosure. If there is an inconsistency between abbreviations, preference should be given to how it is used above. If listed multiple times below, the first listing should be preferred over any subsequent listing(s).
CBG Code Block Group
CBGFI CBG Flush Indicator
CBGTI CBG Transmission Indicator
DCI Downlink Control Information
eMBB enhanced Mobile BroadBand
FI Flush indicator
MU-MIMO Multi-User Multiple Input Multiple Output
PI Pre-emption Indicator
URLLC Ultra-Reliable Low Latency Communication
1×RTT CDMA2000 1× Radio Transmission Technology 3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC Evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

DETAILED DESCRIPTION

Throughout the drawings, the same reference designations are used for similar or corresponding elements. Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Figure 2:
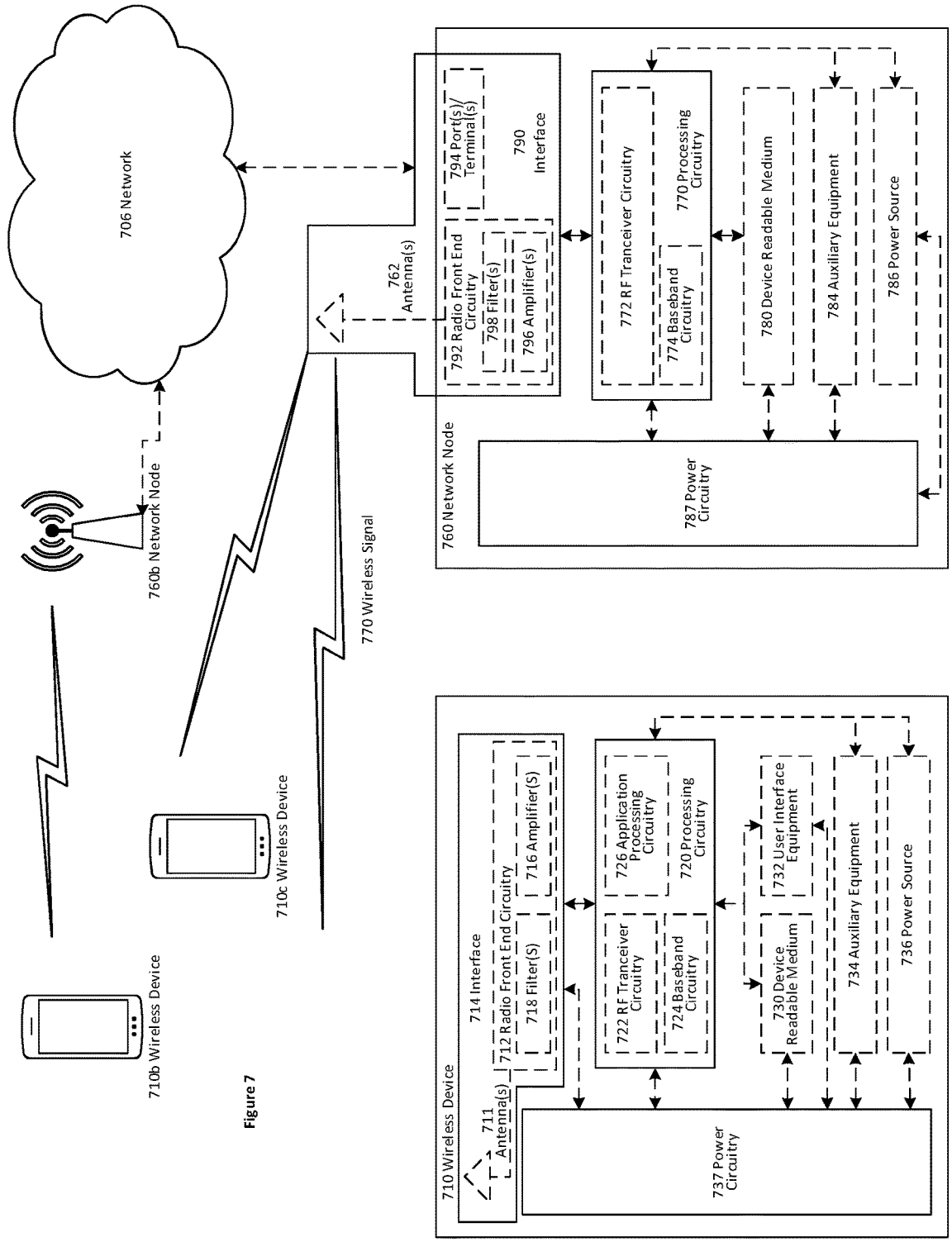
FIG. 2 illustrates a wireless communication network.

Although the subject matter described herein may be implemented in any appropriate type of system using any suitable components, the embodiments disclosed herein are described in relation to a wireless network, such as the example wireless network illustrated in FIG. 2. For simplicity, the wireless network of FIG. 2 only depicts network 706, network nodes 760 and 760*b*, and WDs 710, 710*b*, and 710*c*. In practice, a wireless network may further include any additional elements suitable to support communication between wireless devices or between a wireless device and another communication device, such as a landline telephone, a service provider, or any other network node or end device. Of the illustrated components, network node 760 and wireless device (WD) 710 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 706 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 760 and WD 710 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for side link communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

According to a basic embodiment of the current disclosure, a wireless device or user equipment receives an initial transmission of data. In response thereto, the wireless device identifies overlapping positions in its soft buffer, between the received transmission and any stored bits in the soft buffer. The wireless device then copies and stores the soft values or bits in the identified overlapping positions or the soft values or bits of the received transmission and combines the received transmission with those overlapping bits in the soft buffer.

Figure 3:
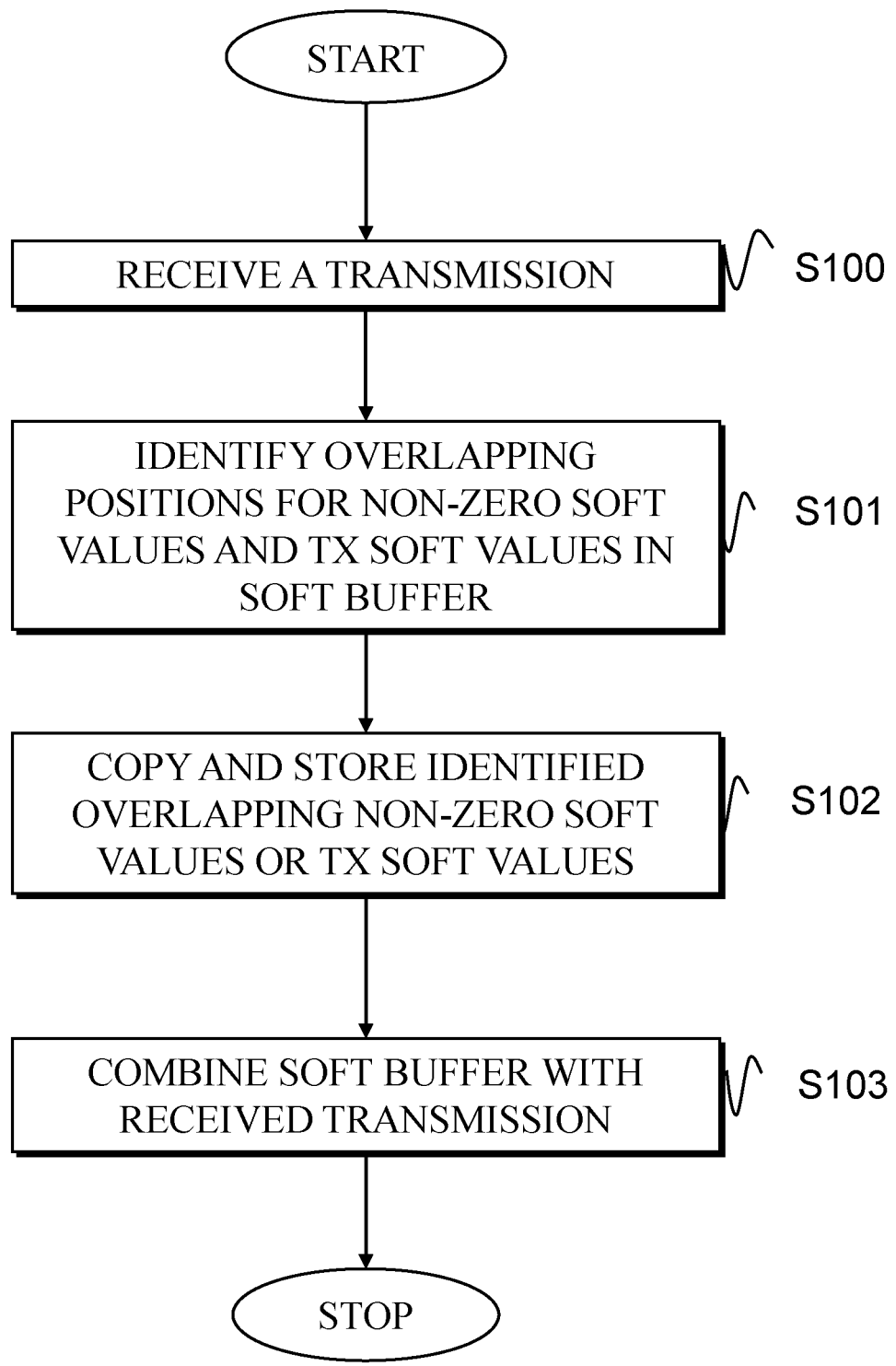
FIG. 3 is a flow chart of an embodiment of the current disclosure.

With reference to FIG. 3, an embodiment of the method according to the present disclosure includes the steps of receiving, S100, in a wireless device e.g. user equipment, a transmission and subsequently identifying, S101, any overlapping positions for non-zero soft values or bits in the soft buffer of the wireless device and the received transmission. Subsequently, the wireless device copies and stores, S102, the soft values of the identified overlapping positions or the soft values of the received transmission. Finally, the soft buffer is combined, S103, with the received transmission.

Optionally, the received transmission is a retransmission of a previously failed transmission to which the wireless device has indicated to the radio network node e.g. base station that the decoding of the transmission was a failure.

Figure 4:
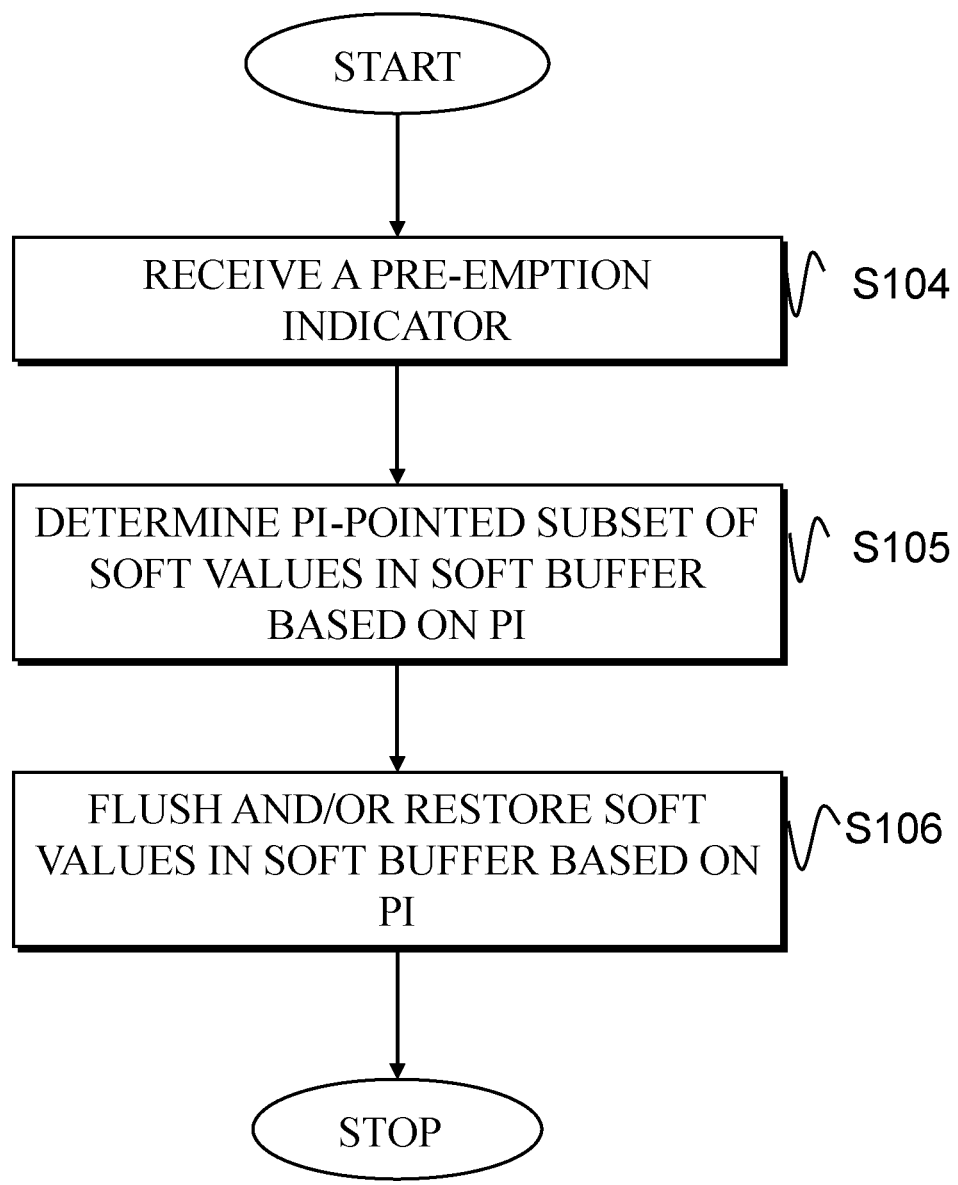
FIG. 4 is a flow chart of another embodiment of the current disclosure.

With reference to FIG. 4, a further embodiment of a method according to the present disclosure includes the steps of receiving, S104, a pre-emption indicator (PI) from a network node e.g. base station, and determining, S105, a so-called PI-pointed subset of soft values in the soft buffer based on the received PI. Finally, the wireless device flushes and/or restores, S106, soft values/bits in the soft buffer based on the received PI.

Figure 5:
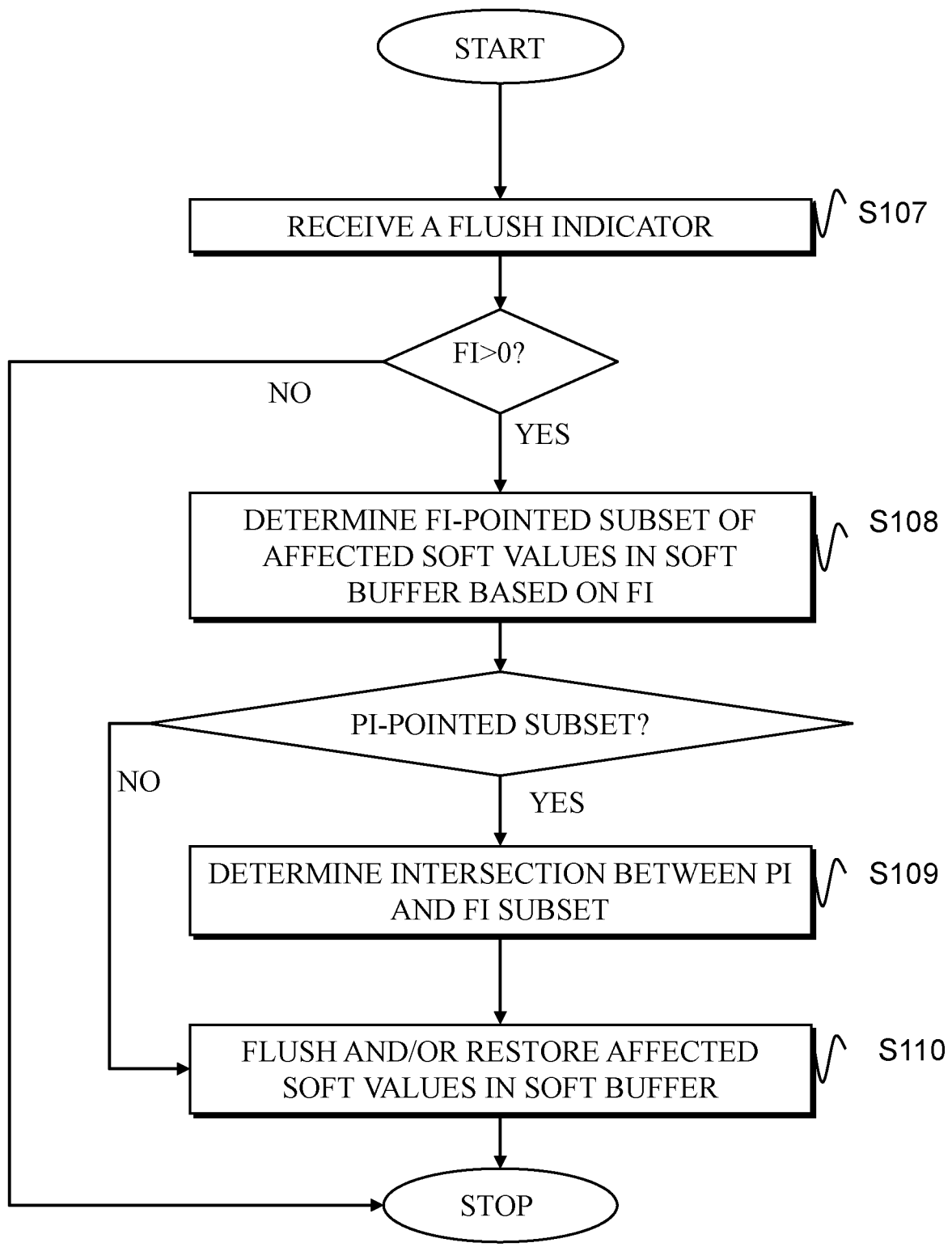
FIG. 5 is a flow chart of a further embodiment of the current disclosure.

With reference to FIG. 5, a further embodiment of a method according to the present disclosure includes the wireless device also receiving, S107, a flush indicator (FI) from the radio network node e.g. base station and determining if the flush indicator is positive or not. If the flush indicator is positive, then the wireless device determines, S108, a so called FI-pointed subset of affected soft values/bits in the soft buffer based on the FI. Subsequently, if there is a PI-pointed subset, as illustrated in FIG. 3, the wireless device determines, S109, an intersection between the PI-pointed and FI-pointed subsets. In other words, those positions in the respective subsets that coincide or overlap. Finally, if there is a PI-pointed subset the wireless device flushes and/or restores, S109, affected soft values in the soft buffer based on the determined intersection. If there is no PI-pointed subset, the wireless device flushes and/or restores, S109, affected soft values in the soft buffer based on the FI-pointed subset.

Figure 6:
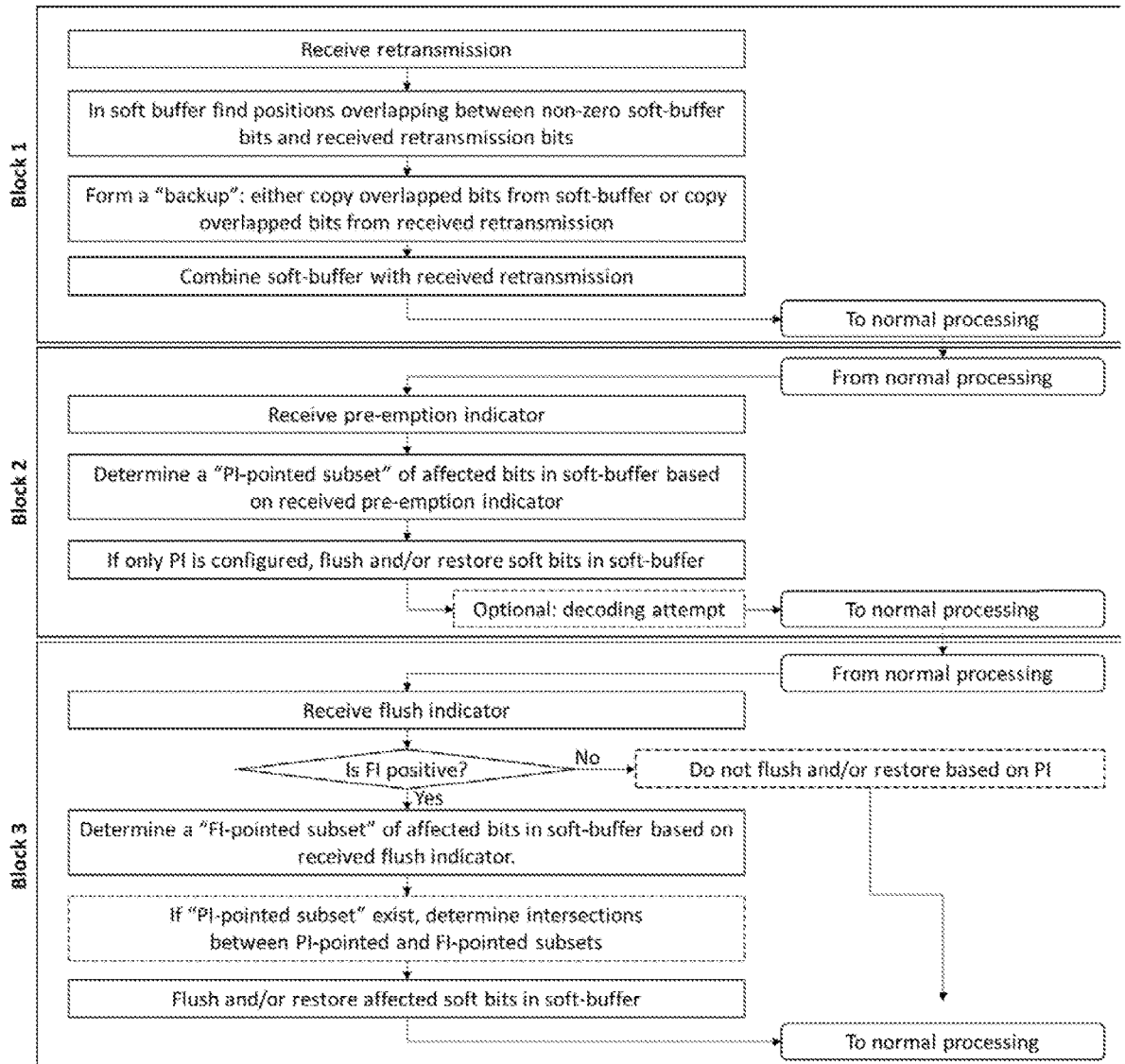
FIG. 6 is a flow chart of another embodiment of the current disclosure.

With reference to FIG. 6, further embodiments of the method according to the present disclosure will be described below. In the following, the wireless device will be referred to as a user equipment, UE. The flow chart consists of three blocks, Block 1, Block 2 and Block 3, where each of them can be used independently, all together or in different combinations. Generally, Block 1 relates to the embodiment in FIG. 3, Block 2 relates to the embodiment in FIG. 4, and Block 3 relates to the embodiment in FIG. 5. According to one embodiment, Block 1 works only in HARQ retransmissions, while Block 2 and Block 3 work for initial transmission receptions as well. UE actions represented in the blocks can be summarized in several high-level embodiments which are described in detail in separate subsections.

In Block 1, when a UE receives a (re)transmission, it typically needs to compare positions of non-zero values stored in the soft buffer with expected positions of received bits and finds overlapping. Then:

In one embodiment, the UE copies overlapped bits from the soft-buffer,

In another embodiment, the UE copies overlapped bits of received retransmissions.

The UE can optionally copy soft bits to:

In one embodiment, to another part of the soft-buffer, which is temporarily, statically or semi-statically allocated for this purpose.

In another embodiment, to a separate buffer or memory.

As is evident, also the separate buffer or memory can be likewise temporarily, statically or semi-statically allocated for this purpose.

The copied and stored bits can be considered as a backup before combining soft-buffer with received (re)transmission. After this backup procedure, the soft-buffer can be combined with the received (re)transmission. The reception process can then be continued according to normal handling, e.g. decoding and the like. Depending on UE capabilities, the UE can store either only one backup for the last reception of retransmission or can store two or more allowed retransmission backups.

In case of pre-emption indicator reception (Block 2), the UE determines positions of affected or likely affected bits in its soft buffer according to information in a pre-emption indication message e.g. pre-emption indicator, PI. This set or subset of affected or likely affected bits will in the following be denoted as a PI-pointed subset. Bits in the soft buffer pointed to by the PI shall be flushed if they are not included in the backup and bits from the backup shall be restored by:

In one embodiment, if backup soft-bits were copied from the soft-buffer before combining, they may need to be copied back without modification.

In another embodiment, if the backup soft-bits are a copy of a received retransmission, they may need to be subtracted from corresponding soft-values in the soft-buffer.

If PI is configured together with a code block group flush indication, FI, the actual flushing and/or restoring can be done or not done later in Block 3. Optionally, in the end of Block 2, UE can try to decode affected code blocks before coming back to normal processing.

On reception of code block group flush indicator, FI, (Block 3), the UE behaviour depends on the indicator, FI, value. If the FI is negative, UE can ignore PI for this code block or code block group and go to normal processing. This can be useful in some cases e.g. MU-MIMO, which will be described further down. When FI is positive for this code block or code block group, UE needs to determine FI-pointed subset of soft values in the soft buffer. In case of an already present PI-pointed subset for this transmission, UE can try to find intersections between the two subsets to decrease flushing and/or restoring of soft values or bits. After actual flushing and/or restoring, the UE can come back to normal processing. As already mentioned, Block 3 may operate for initial transmission as well as re-transmission. Furthermore, there are embodiments where UE does not have extra backup memory. In such embodiments, the UE determines intersections between subsets in the soft buffer pointed by PI and FI and only the intersection part in the soft buffer is flushed.

A First Embodiment: Pre-Empted Retransmission

Figure 7:
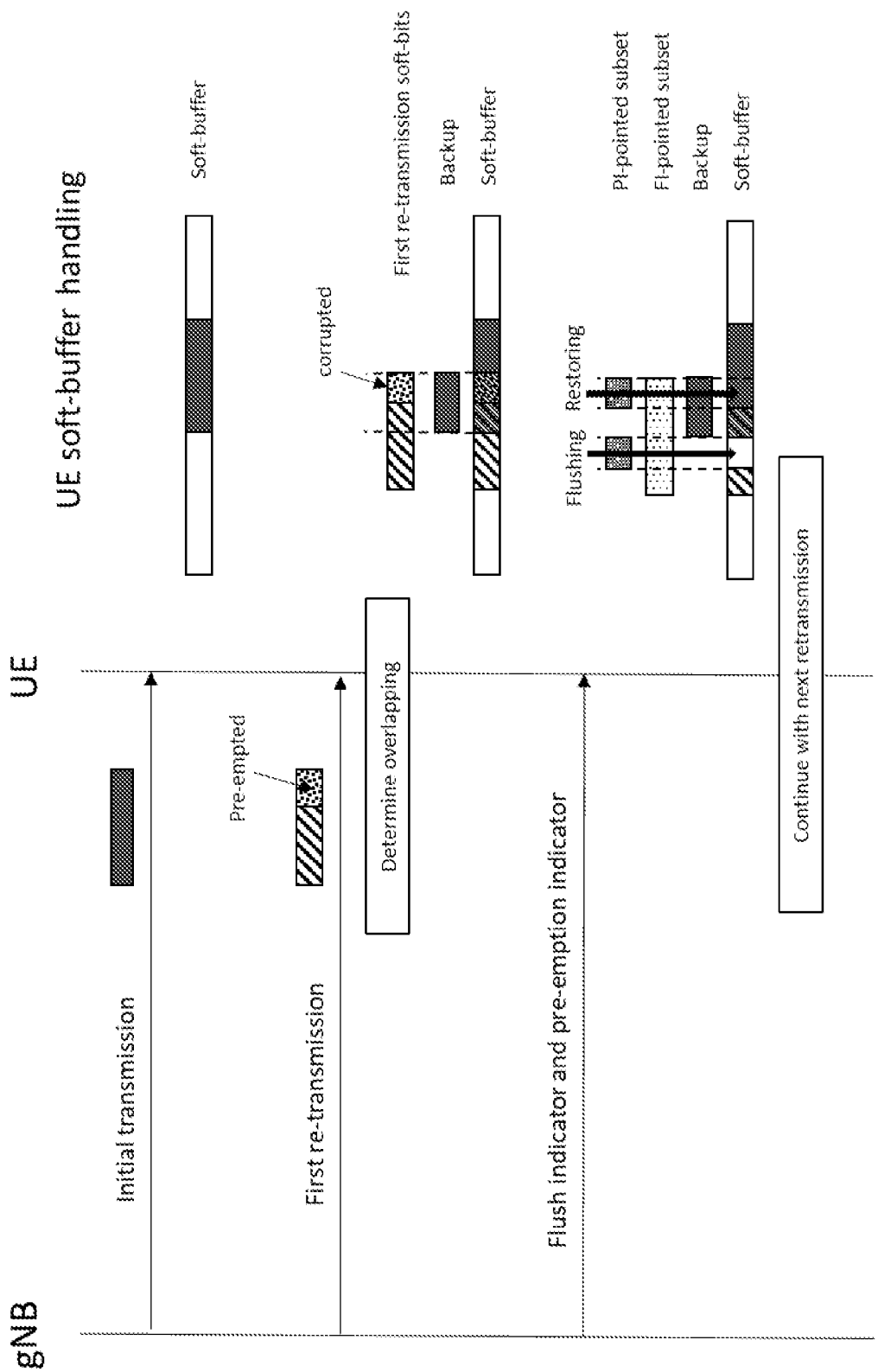
FIG. 7 is a signaling chart illustrating an embodiment of the current disclosure.

With reference to FIG. 7 and Block 2 of FIG. 6, a further embodiment will be described. This embodiment was mostly described in the previous section. The key enabler for this solution is Block 1 of the general flowchart. According to Block 1, UE can keep soft-values backup in its memory to proceed with restoring instead of flushing for some bits in soft-buffer. An example of signalling chart is illustrated in FIG. 7, where it starts from initial transmission, but the embodiment can be applied in any re-transmission attempt.

The figure illustrates that a part of the first transmission is pre-empted. In some examples, the first re-transmission consists of one or more code blocks and some of the code blocks may be affected by the pre-emption. In some examples, whole code blocks are affected while in other examples code blocks are partly affected. FIG. 7 can be viewed as an example with a single code block or code block group which is partly pre-empted. The flush indicated may in such examples indicate or refer to whole of the first re-transmission as illustrated by the "PI-pointed subset". FIG. 7 can also be viewed as that first re-transmission consists of two or more code blocks or code block groups where one or more code blocks is pre-empted or partly pre-empted. The flush indicator may in such alternative view consist of single bit only such that either whole first re-transmission is referred or not at all.

Figure 8:
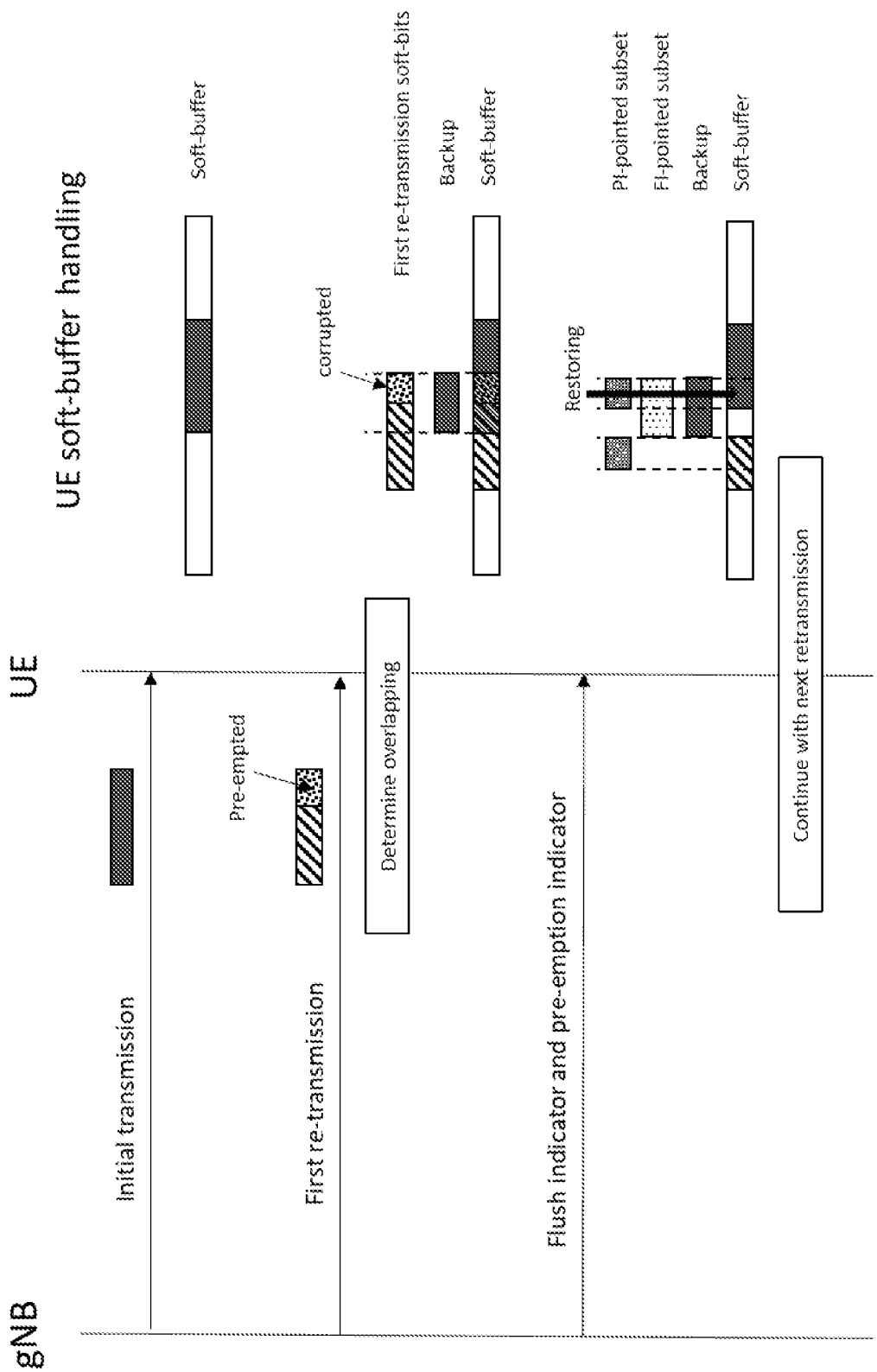
FIG. 8 is a signaling chart illustrating another embodiment of the current disclosure.

With reference to FIG. 8, and Block 3 of FIG. 6, another embodiment of the present disclosure will be described. In other examples of this embodiment the first re-transmission consists of two or more code blocks or code block groups and the flush indicator can indicate that one or more code blocks or code block groups needs flushing. FIG. 8 illustrates such other example where the FI-pointed subset indicates the second half of first re-transmission.

In the example illustrated by FIG. 8 the PI indicates pre-empted resources overlapping the first re-transmission in two parts, a first part covering (partly) the first half of first transmission and a second part covering (partly) the second half of first re-transmission. Since the flush indicator indicates only the second half of first re-transmission the UE may be configured to ignore the first part indicated by PI. This is indicated in FIG. 8 by "Ignore PI". However, for the second part indicated by PI the UE performs restore of soft-values corresponding the second part. This is indicated in FIG. 8 by "Restoring". From FIG. 8 it can be noted that this shows an example where the UE flush exactly the corrupted soft-values and only those soft-values from first re-transmission compared to the example in FIG. 8 wherein also some non-corrupted soft-values was flushed.

In some examples of this embodiment the CBGFI can be used in combination with CBGTI to indicate which code block groups that shall be flushed. For example, initial transmission may consist of 3 code block groups and the CBGTI may indicate "$1^{st}$ CBG", "$2^{nd}$ CBG", "$3^{rd}$ CBG", "$1^{st}$ & $2^{nd}$ CBG", "$1^{st}$ & $3^{rd}$ CBG", "$2^{nd}$ & $3^{rd}$ CBG", "All CBG". CBGFI may then indicate "flush" or "no flush" using a 2-bit value with interpretation '0'="No flush", '1'="first half", '2'="second half", '3'="whole". For example, if CBGTI indicate "$1^{st}$ & $3^{rd}$ CBG" a CBGFI='1' may indicate that soft-values for 1st CBG shall be flushed while CBGFI='2' would indicate $3^{rd}$ CBG and CBGFI='2' would indicate both 1st and $3^{rd}$ CBG. If CBGTI indicates "$2^{nd}$ CBG" then CBGFI='1' would indicate a first part of $2^{nd}$ CBG, CBGFI='2' would indicate a second part of $2^{nd}$ CBG and CBGFI='3' would indicate whole $2^{nd}$ CBG.

A Second Embodiment: Missing Flush Indicator

If UE is pre-empted and receives a pre-emption indicator but has not decoded a control message with the flush indicator, the UE was either not affected by the pre-emption or failed decoding the control message with the flush indicator. In the first case, the UE should ignore the pre-emption indication. In the second case, the UE can count on a retransmission being triggered due to the missing feedback from the UE. Also, in this case the pre-emption indicator can be ignored until the retransmission of the flushing indication. In the case that the retransmission of the flushing indicator is done without repeating the pre-emption indicator, the old PI-pointed subset can be used based on the previously received pre-emption indicator, that is the one received after the latest previous transmission of the soft-bits indicated by the flushing indicator.

A Third Embodiment: MU-MIMO Transmission

Figure 9:
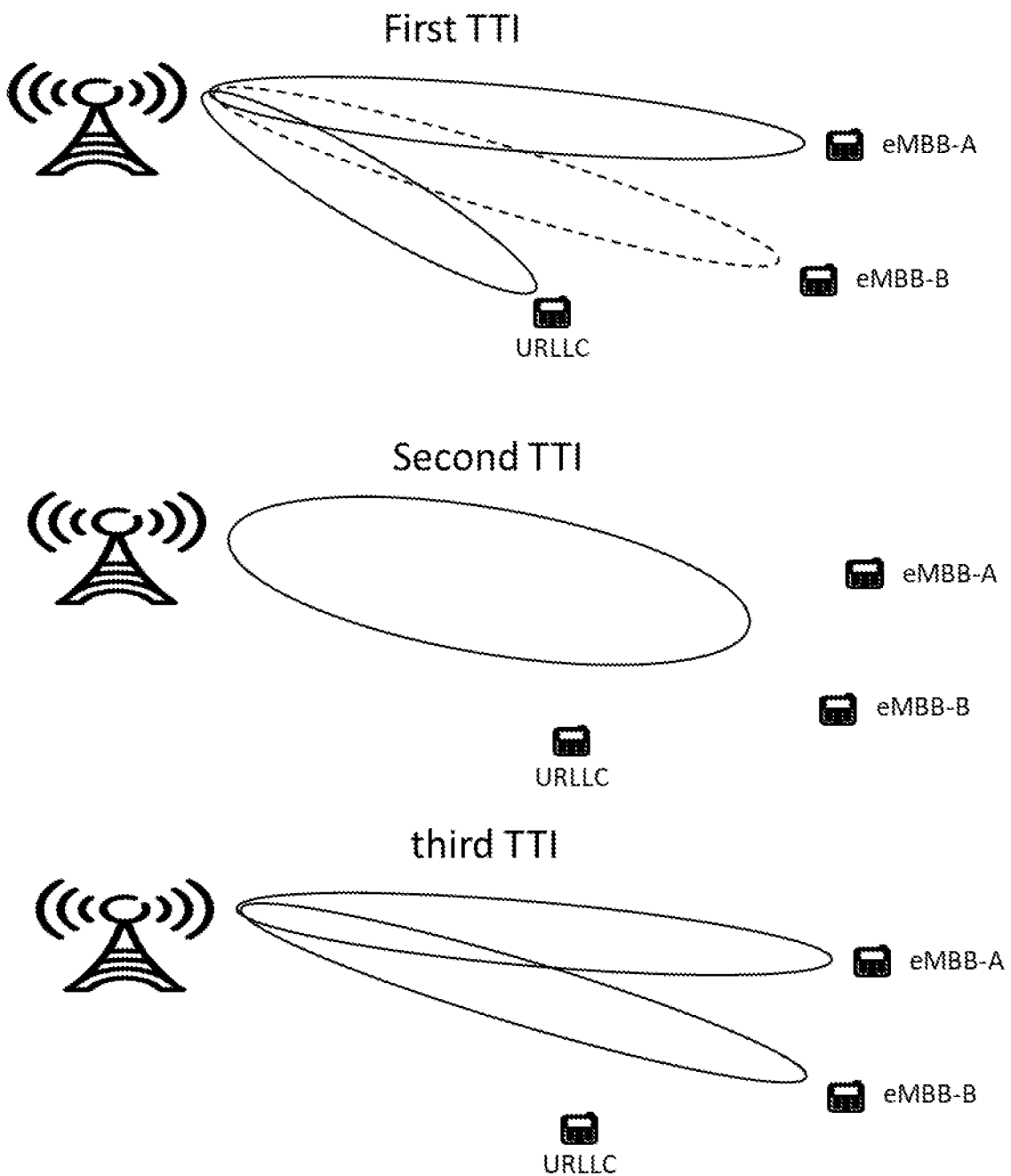
FIG. 9 illustrates embodiments of the current disclosure.

With reference to the beam charts of FIG. 9, further embodiments of a method according to the present disclosure will be described. These embodiments illustrate pre-emption in the context of a MU-MIMO transmission to eMBB UE A and B due to a transmission to a URLLC UE. The dashed line (beam) illustrates that the transmission to the eMBB UE B is pre-empted while the solid line indicates a non-pre-empted transmission.

In this scenario, there are two eMBB UEs (A) and (B) and one URLLC UE. When the URLLC UE is scheduled the eMBB UE B cannot be scheduled since the beam will interfere too much with the transmission to the URLLC UE. For the eMBB UE A this is not the case; the transmission to eMBB UE A causes acceptable interference. Hence, when eMBB UE A and eMBB UE B are MU-MIMO scheduled with ongoing transmissions, when data to the URLLC UE arrive, it may be desired to pre-empt the transmission to eMBB UE B. The considered scenario is illustrated in FIG. 9.

The embodiment is used by both eMBB UEs wherein both first (initial) transmissions to these UE fails. The transmission to eMBB UE B fails due to pre-emption while the transmission to eMBB UE A fails due to radio conditions and/or interference from other transmissions (not shown in figure). Clearly, it is desirable to indicate to respective eMBB UE that eMBB UE A can safely combine soft-bits for first and second transmission (i.e. the re-transmission of first transmission) while eMBB UE B must flush corrupted soft bits for its first transmission before combining with the soft bits for second transmission.

Figure 10:
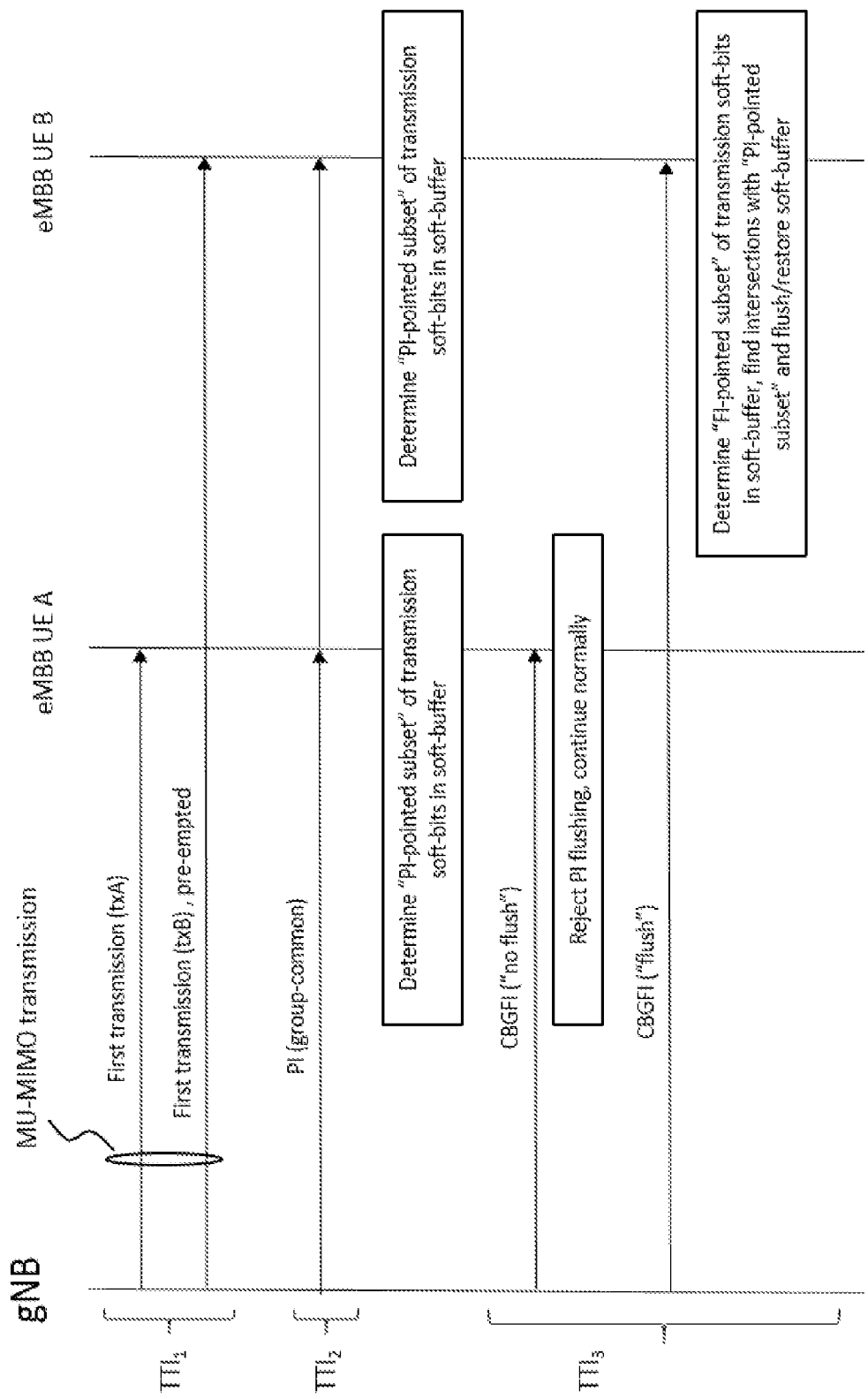
FIG. 10 is a signaling chart illustrating a further embodiment of the current disclosure.

A signalling chart between the network node (gNB) and the two eMBB UEs is illustrated in FIG. 10.

As illustrated there are two first (initial) transmissions txA and txB to eMBB UE A respectively eMBB UE B. First transmission txA is not pre-empted while first transmission txB is pre-empted. The eMBB UEs receive the group-common pre-emption indicator indicating that pre-emption occurred. They both determine a respective PI-pointed subset of received soft bits for respective first transmission soft-bits based on the pre-emption indicator and their respective first set of soft-buffer soft bits. Then eMBB UE A receives a flush indicator indicating "no flush" while eMBB UE B receives a flush indicator indicating "flush". Then eMBB UE A ignores received pre-emption indication and continue normally. The eMBB UE B determines FI-pointed subset of soft-bits in soft-buffer where it finds intersections between "PI-pointed" and "FI-pointed" subsets and flush/restore its soft-buffer. After that both eMBB UEs can receive next retransmission and act according to Block 1 of general flowchart.

The example illustrated by FIG. 7 is an example of when the embodiment is used for initial transmission. In another example, either one or both first transmissions in FIG. 8 may be a re-transmission. It should also be noted that in some examples of this embodiment the UE have extra backup memory and in other examples the UE has no extra backup memory. In such other examples, the UE determines an intersection of PI and FI pointed soft bits in the soft-buffer and wherein only the intersection part is flushed while the soft bits that not are in intersection between PI and FI pointed sets are rejected from flushing.

A Fourth Embodiment. Modification of Soft Values Possibly Affected from Pre-Emption Due to the fact, that CBGFI and PI may point at the relatively large time/frequency region, which may consist of pre-empted and not pre-empted data, the flushing procedure can erase not only corrupted data, but original data too. As an alternative, potentially pre-empted soft-values can be divided by some value. Division (or reduction abs values of soft-bits) makes them less important in decoding process. Hence, original and pre-empted data bits in potentially pre-empted area can be used in decoding process anyway, which can bring performance gain when there are significantly more original bits, then corrupted.

Figure 11:
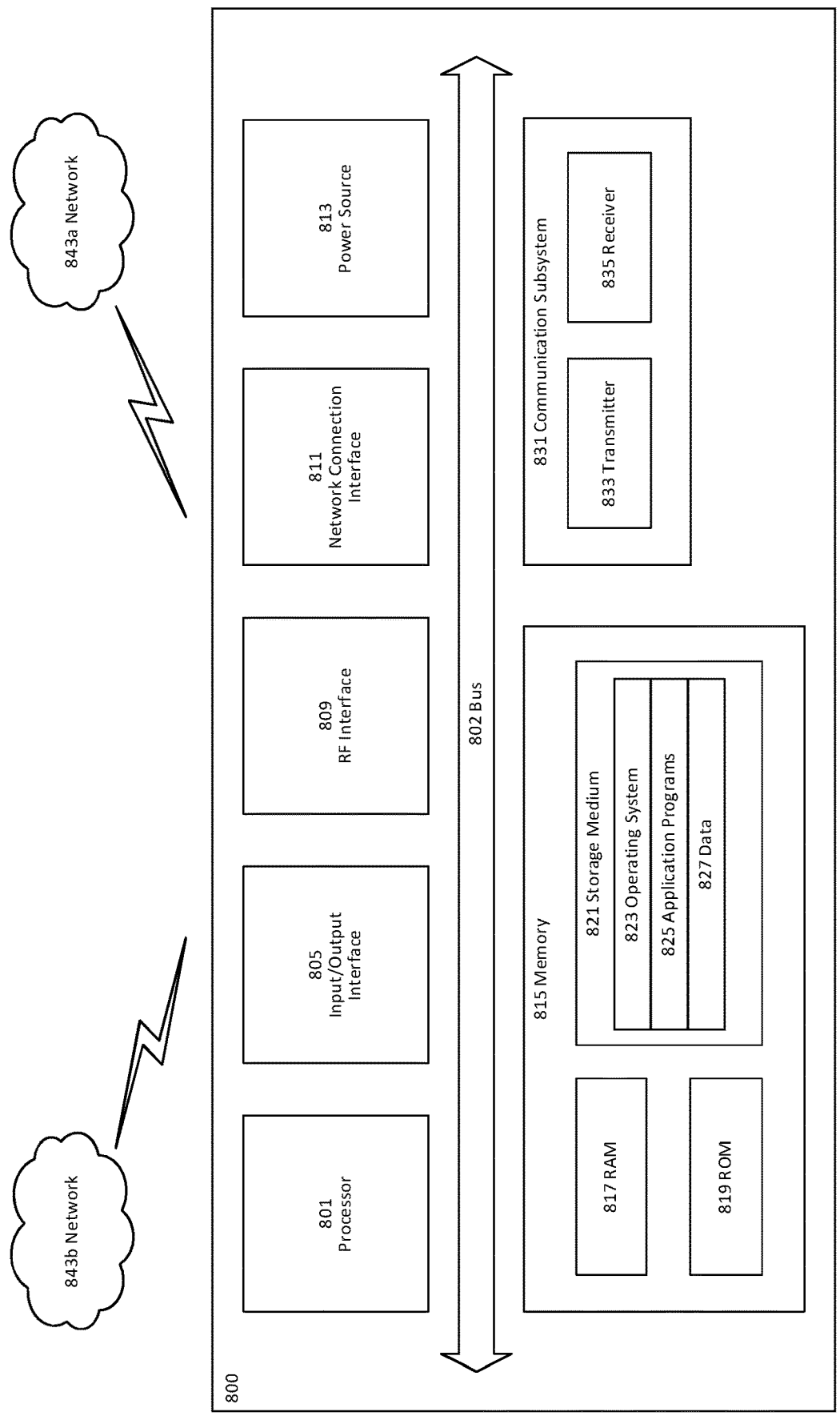
FIG. 11 illustrates an embodiment of a wireless device according to the current disclosure.

With reference to FIGS. 2 and 11, various embodiments of a wireless device, WD, or user equipment 710 according to the present disclosure will be described. In a general embodiment, the wireless device or user equipment 710 is configured to perform the steps of the embodiments of the method as described above. In particular, the wireless device or user equipment 710 is configured to receive a transmission, e.g. a regular transmission or a re-transmission of a previous transmission, and to identify overlapping positions for non-zero soft values in a soft buffer and received transmission soft values. Further, the wireless device 710 is configured to, copy and store identified overlapping non-zero soft values or received transmission soft values, and finally to combine soft buffer with received transmission.

According to further embodiments, the wireless device 710 is further configured to receive a pre-emption, PI, indicator, determine a (PI-pointed) subset of affected soft values in soft buffer based on said received pre-emption indicator, and to flush and/or restore soft values in said soft buffer.

As described in the embodiments of the methods, the wireless device 710 may further be configured to receive a flush indicator, FI.

For the previously described situation with both a PI and FI transmitted to the wireless device, the wireless device may be configured to if the received FI is positive, determine a FI-pointed subset of affected soft values in said soft buffer based on said received FI indicator, and further if a PI-pointed subset exists, determine intersections between PI-pointed and FI-pointed subsets, and to flush and/or restore affected soft values in said soft buffer.

Accordingly, if the received FI is negative, the wireless device is additionally configured to abstain from flushing and/or restoring affected soft values based on PI. In other words, the wireless device will proceed to normal processes such as decoding.

In order to further support the described soft buffer handling, the wireless device is configured to store said overlapping non-zero soft values or received transmission soft values in an allocated part of the soft buffer or in a separate buffer or memory. Depending on the capability of the wireless device, it can be configured to store the overlapping non-zero soft values or received transmission soft values in a part of said soft buffer which is temporarily, statically or semi-statically allocated.

Further, as mentioned previously, the transmission can be a first transmission or a re-transmission. In addition, According to a particular embodiment, the wireless device 710 comprises a processor circuitry 720 and a memory, which memory comprises instructions executable by the processor circuitry 720, whereby the processor circuitry 720 is operative to receive a transmission, and to identify overlapping positions for non-zero soft values in a soft buffer and received transmission soft values, copy and store identified overlapping non-zero soft values or received transmission soft values, and combine soft buffer with received transmission.

With reference to FIG. 2, further descriptions of the embodiments will follow below.

In FIG. 2, network node 760 includes processing circuitry 770, device readable medium 780, interface 790, auxiliary equipment 784, power source 786, power circuitry 787, and antenna 762. Although network node 760 illustrated in the example wireless network of FIG. 2 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 760 are depicted as single boxes located within a larger box, or nested within multiple boxes, in practice, a network node may comprise multiple different physical components that make up a single illustrated component (e.g., device readable medium 780 may comprise multiple separate hard drives as well as multiple RAM modules).

Similarly, network node 760 may be composed of multiple physically separate components (e.g., a NodeB component and a RNC component, or a BTS component and a BSC component, etc.), which may each have their own respective components. In certain scenarios in which network node 760 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 760 may be configured to support multiple radio access technologies (RATs). In such embodiments, some components may be duplicated (e.g., separate device readable medium 780 for the different RATs) and some components may be reused (e.g., the same antenna 762 may be shared by the RATs). Network node 760 may also include multiple sets of the various illustrated components for different wireless technologies integrated into network node 760, such as, for example, GSM, WCDMA, LTE, NR, WiFi, or Bluetooth wireless technologies. These wireless technologies may be integrated into the same or different chip or set of chips and other components within network node 760.

Processing circuitry 770 is configured to perform any determining, calculating, or similar operations (e.g., certain obtaining operations) described herein as being provided by a network node. These operations performed by processing circuitry 770 may include processing information obtained by processing circuitry 770 by, for example, converting the obtained information into other information, comparing the obtained information or converted information to information stored in the network node, and/or performing one or more operations based on the obtained information or converted information, and as a result of said processing making a determination.

Processing circuitry 770 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 760 components, such as device readable medium 780, network node 760 functionality. For example, processing circuitry 770 may execute instructions stored in device readable medium 780 or in memory within processing circuitry 770. Such functionality may include providing any of the various wireless features, functions, or benefits discussed herein. In some embodiments, processing circuitry 770 may include a system on a chip (SOC).

In some embodiments, processing circuitry 770 may include one or more of radio frequency (RF) transceiver circuitry 772 and baseband processing circuitry 774. In some embodiments, radio frequency (RF) transceiver circuitry 772 and baseband processing circuitry 774 may be on separate chips (or sets of chips), boards, or units, such as radio units and digital units. In alternative embodiments, part or all of RF transceiver circuitry 772 and baseband processing circuitry 774 may be on the same chip or set of chips, boards, or units In certain embodiments, some or all the functionality described herein as being provided by a network node, base station, eNB or other such network device may be performed by processing circuitry 770 executing instructions stored on device readable medium 780 or memory within processing circuitry 770. In alternative embodiments, some or all the functionality may be provided by processing circuitry 770 without executing instructions stored on a separate or discrete device readable medium, such as in a hard-wired manner. In any of those embodiments, whether executing instructions stored on a device readable storage medium or not, processing circuitry 770 can be configured to perform the described functionality. The benefits provided by such functionality are not limited to processing circuitry 770 alone or to other components of network node 760 but are enjoyed by network node 760 as a whole, and/or by end users and the wireless network generally.

Device readable medium 780 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 770. Device readable medium 780 may store any suitable instructions, data or information, including a computer program, software, an application including one or more of logic, rules, code, tables, etc. and/or other instructions capable of being executed by processing circuitry 770 and, utilized by network node 760. Device readable medium 780 may be used to store any calculations made by processing circuitry 770 and/or any data received via interface 790. In some embodiments, processing circuitry 770 and device readable medium 780 may be considered to be integrated.

Interface 790 is used in the wired or wireless communication of signaling and/or data between network node 760, network 706, and/or WDs 710. As illustrated, interface 790 comprises port(s)/terminal(s) 794 to send and receive data, for example to and from network 706 over a wired connection. Interface 790 also includes radio front end circuitry 792 that may be coupled to, or in certain embodiments a part of, antenna 762. Radio front end circuitry 792 comprises filters 798 and amplifiers 796. Radio front end circuitry 792 may be connected to antenna 762 and processing circuitry 770. Radio front end circuitry may be configured to condition signals communicated between antenna 762 and processing circuitry 770. Radio front end circuitry 792 may receive digital data that is to be sent out to other network nodes or WDs via a wireless connection. Radio front end circuitry 792 may convert the digital data into a radio signal having the appropriate channel and bandwidth parameters using a combination of filters 798 and/or amplifiers 796. The radio signal may then be transmitted via antenna 762. Similarly, when receiving data, antenna 762 may collect radio signals which are then converted into digital data by radio front end circuitry 792. The digital data may be passed to processing circuitry 770. In other embodiments, the interface may comprise different components and/or different combinations of components.

In certain alternative embodiments, network node 760 may not include separate radio front end circuitry 792, instead, processing circuitry 770 may comprise radio front end circuitry and may be connected to antenna 762 without separate radio front end circuitry 792. Similarly, in some embodiments, all or some of RF transceiver circuitry 772 may be considered a part of interface 790. In still other embodiments, interface 790 may include one or more ports or terminals 794, radio front end circuitry 792, and RF transceiver circuitry 772, as part of a radio unit (not shown), and interface 790 may communicate with baseband processing circuitry 774, which is part of a digital unit (not shown).

Antenna 762 may include one or more antennas, or antenna arrays, configured to send and/or receive wireless signals. Antenna 762 may be coupled to radio front end circuitry 790 and may be any type of antenna capable of transmitting and receiving data and/or signals wirelessly. In some embodiments, antenna 762 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 762 may be separate from network node 760 and may be connectable to network node 760 through an interface or port.

Antenna 762, interface 790, and/or processing circuitry 770 may be configured to perform any receiving operations and/or certain obtaining operations described herein as being performed by a network node. Any information, data and/or signals may be received from a wireless device, another network node and/or any other network equipment. Similarly, antenna 762, interface 790, and/or processing circuitry 770 may be configured to perform any transmitting operations described herein as being performed by a network node. Any information, data and/or signals may be transmitted to a wireless device, another network node and/or any other network equipment.

Power circuitry 787 may comprise, or be coupled to, power management circuitry and is configured to supply the components of network node 760 with power for performing the functionality described herein. Power circuitry 787 may receive power from power source 786. Power source 786 and/or power circuitry 787 may be configured to provide power to the various components of network node 760 in a form suitable for the respective components (e.g., at a voltage and current level needed for each respective component). Power source 786 may either be included in, or external to, power circuitry 787 and/or network node 760. For example, network node 760 may be connectable to an external power source (e.g., an electricity outlet) via an input circuitry or interface such as an electrical cable, whereby the external power source supplies power to power circuitry 787. As a further example, power source 786 may comprise a source of power in the form of a battery or battery pack which is connected to, or integrated in, power circuitry 787. The battery may provide backup power should the external power source fail. Other types of power sources, such as photovoltaic devices, may also be used.

Alternative embodiments of network node 760 may include additional components beyond those shown in FIG. 2 that may be responsible for providing certain aspects of the network node's functionality, including any of the functionality described herein and/or any functionality necessary to support the subject matter described herein. For example, network node 760 may include user interface equipment to allow input of information into network node 760 and to allow output of information from network node 760. This may allow a user to perform diagnostic, maintenance, repair, and other administrative functions for network node 760.

As illustrated, wireless device 710 includes antenna 711, interface 714, processing circuitry 720, device readable medium 730, user interface equipment 732, auxiliary equipment 734, power source 736 and power circuitry 737. WD 710 may include multiple sets of one or more of the illustrated components for different wireless technologies supported by WD 710, such as, for example, GSM, WCDMA, LTE, NR, WiFi, WiMAX, or Bluetooth wireless technologies, just to mention a few. These wireless technologies may be integrated into the same or different chips or set of chips as other components within WD 710.

Antenna 711 may include one or more antennas or antenna arrays, configured to send and/or receive wireless signals, and is connected to interface 714. In certain alternative embodiments, antenna 711 may be separate from WD 710 and be connectable to WD 710 through an interface or port. Antenna 711, interface 714, and/or processing circuitry 720 may be configured to perform any receiving or transmitting operations described herein as being performed by a WD. Any information, data and/or signals may be received from a network node and/or another WD. In some embodiments, radio front end circuitry and/or antenna 711 may be considered an interface.

As illustrated, interface 714 comprises radio front end circuitry 712 and antenna 711. Radio front end circuitry 712 comprise one or more filters 718 and amplifiers 716. Radio front end circuitry 714 is connected to antenna 711 and processing circuitry 720 and is configured to condition signals communicated between antenna 711 and processing circuitry 720. Radio front end circuitry 712 may be coupled to or a part of antenna 711. In some embodiments, WD 710 may not include separate radio front end circuitry 712; rather, processing circuitry 720 may comprise radio front end circuitry and may be connected to antenna 711. Similarly, in some embodiments, some or all of RF transceiver circuitry 722 may be considered a part of interface 714. Radio front end circuitry 712 may receive digital data that is to be sent out to other network nodes or WDs via a wireless connection. Radio front end circuitry 712 may convert the digital data into a radio signal having the appropriate channel and bandwidth parameters using a combination of filters 718 and/or amplifiers 716. The radio signal may then be transmitted via antenna 711. Similarly, when receiving data, antenna 711 may collect radio signals which are then converted into digital data by radio front end circuitry 712. The digital data may be passed to processing circuitry 720. In other embodiments, the interface may comprise different components and/or different combinations of components.

Processing circuitry 720 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 710 components, such as device readable medium 730, WD 710 functionality. Such functionality may include providing any of the various wireless features or benefits discussed herein. For example, processing circuitry 720 may execute instructions stored in device readable medium 730 or in memory within processing circuitry 720 to provide the functionality disclosed herein.

As illustrated, processing circuitry 720 includes one or more of RF transceiver circuitry 722, baseband processing circuitry 724, and application processing circuitry 726. In other embodiments, the processing circuitry may comprise different components and/or different combinations of components. In certain embodiments processing circuitry 720 of WD 710 may comprise a SOC. In some embodiments, RF transceiver circuitry 722, baseband processing circuitry 724, and application processing circuitry 726 may be on separate chips or sets of chips. In alternative embodiments, part or all of baseband processing circuitry 724 and application processing circuitry 726 may be combined into one chip or set of chips, and RF transceiver circuitry 722 may be on a separate chip or set of chips. In still alternative embodiments, part or all of RF transceiver circuitry 722 and baseband processing circuitry 724 may be on the same chip or set of chips, and application processing circuitry 726 may be on a separate chip or set of chips. In yet other alternative embodiments, part or all of RF transceiver circuitry 722, baseband processing circuitry 724, and application processing circuitry 726 may be combined in the same chip or set of chips. In some embodiments, RF transceiver circuitry 722 may be a part of interface 714. RF transceiver circuitry 722 may condition RF signals for processing circuitry 720.

In certain embodiments, some or all the functionality described herein as being performed by a WD may be provided by processing circuitry 720 executing instructions stored on device readable medium 730, which in certain embodiments may be a computer-readable storage medium. In alternative embodiments, some or all the functionality may be provided by processing circuitry 720 without executing instructions stored on a separate or discrete device readable storage medium, such as in a hard-wired manner. In any of those particular embodiments, whether executing instructions stored on a device readable storage medium or not, processing circuitry 720 can be configured to perform the described functionality. The benefits provided by such functionality are not limited to processing circuitry 720 alone or to other components of WD 710, but are enjoyed by WD 710 as a whole, and/or by end users and the wireless network generally.

Processing circuitry 720 may be configured to perform any determining, calculating, or similar operations (e.g., certain obtaining operations) described herein as being performed by a WD. These operations, as performed by processing circuitry 720, may include processing information obtained by processing circuitry 720 by, for example, converting the obtained information into other information, comparing the obtained information or converted information to information stored by WD 710, and/or performing one or more operations based on the obtained information or converted information, and as a result of said processing making a determination.

Device readable medium 730 may be operable to store a computer program, software, an application including one or more of logic, rules, code, tables, etc. and/or other instructions capable of being executed by processing circuitry 720. Device readable medium 730 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 720. In some embodiments, processing circuitry 720 and device readable medium 730 may be considered to be integrated.

Further, the current disclosure presents a computer program comprising instructions, which when executed by at least one processor circuitry, cause the processor(s) circuitry to perform the steps of the above described embodiments. Additionally, the current disclosure presents a carrier comprising the computer program, wherein the carrier is one of an electronic signal, an optical signal, an electromagnetic signal, a magnetic signal, an electric signal, a radio signal, a microwave signal, or a computer-readable storage medium.

User interface equipment 732 may provide components that allow for a human user to interact with WD 710. Such interaction may be of many forms, such as visual, audial, tactile, etc. User interface equipment 732 may be operable to produce output to the user and to allow the user to provide input to WD 710. The type of interaction may vary depending on the type of user interface equipment 732 installed in WD 710. For example, if WD 710 is a smart phone, the interaction may be via a touch screen; if WD 710 is a smart meter, the interaction may be through a screen that provides usage (e.g., the number of gallons used) or a speaker that provides an audible alert (e.g., if smoke is detected). User interface equipment 732 may include input interfaces, devices and circuits, and output interfaces, devices and circuits. User interface equipment 732 is configured to allow input of information into WD 710 and is connected to processing circuitry 720 to allow processing circuitry 720 to process the input information. User interface equipment 732 may include, for example, a microphone, a proximity or other sensor, keys/buttons, a touch display, one or more cameras, a USB port, or other input circuitry. User interface equipment 732 is also configured to allow output of information from WD 710, and to allow processing circuitry 720 to output information from WD 710. User interface equipment 732 may include, for example, a speaker, a display, vibrating circuitry, a USB port, a headphone interface, or other output circuitry. Using one or more input and output interfaces, devices, and circuits, of user interface equipment 732, WD 710 may communicate with end users and/or the wireless network and allow them to benefit from the functionality described herein.

Auxiliary equipment 734 is operable to provide more specific functionality which may not be generally performed by WDs. This may comprise specialized sensors for doing measurements for various purposes, interfaces for additional types of communication such as wired communications etc. The inclusion and type of components of auxiliary equipment 734 may vary depending on the embodiment and/or scenario.

Power source 736 may, in some embodiments, be in the form of a battery or battery pack. Other types of power sources, such as an external power source (e.g., an electricity outlet), photovoltaic devices or power cells, may also be used. WD 710 may further comprise power circuitry 737 for delivering power from power source 736 to the various parts of WD 710 which need power from power source 736 to carry out any functionality described or indicated herein. Power circuitry 737 may in certain embodiments comprise power management circuitry. Power circuitry 737 may additionally or alternatively be operable to receive power from an external power source; in which case WD 710 may be connectable to the external power source (such as an electricity outlet) via input circuitry or an interface such as an electrical power cable. Power circuitry 737 may also in certain embodiments be operable to deliver power from an external power source to power source 736. This may be, for example, for the charging of power source 736. Power circuitry 737 may perform any formatting, converting, or other modification to the power from power source 736 to make the power suitable for the respective components of WD 710 to which power is supplied.

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 8200 may be any UE identified by the $3^{rd}$ Generation Partnership Project (3GPP), including a NB-IoT UE, a machine type communication (MTC) UE, and/or an enhanced MTC (eMTC) UE. UE 800, as illustrated in FIG. 11, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE 800 includes processing circuitry 801 that is operatively coupled to input/output interface 805, radio frequency (RF) interface 809, network connection interface 811, memory 815 including random access memory (RAM) 817, read-only memory (ROM) 819, and storage medium 821 or the like, communication subsystem 831, power source 833, and/or any other component, or any combination thereof. Storage medium 821 includes operating system 823, application program 825, and data 827. In other embodiments, storage medium 821 may include other similar types of information. Certain UEs may utilize all of the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 801 may be configured to process computer instructions and data. Processing circuitry 801 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 801 may include two central processing units (CPUs). Data may be information in a form suitable for use by a computer.

In the depicted embodiment, input/output interface 805 may be configured to provide a communication interface to an input device, output device, or input and output device. UE 800 may be configured to use an output device via input/output interface 805. An output device may use the same type of interface port as an input device. For example, a USB port may be used to provide input to and output from UE 800. The output device may be a speaker, a sound card, a video card, a display, a monitor, a printer, an actuator, an emitter, a smartcard, another output device, or any combination thereof. UE 800 may be configured to use an input device via input/output interface 805 to allow a user to capture information into UE 800. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 809 may be configured to provide a communication interface to RF components such as a transmitter, a receiver, and an antenna. Network connection interface 811 may be configured to provide a communication interface to network 843a. Network 843a may encompass wired and/or wireless networks such as a local-area network (LAN), a wide-area network (WAN), a computer network, a wireless network, a telecommunications network, another like network or any combination thereof. For example, network 843a may comprise a Wi-Fi network. Network connection interface 811 may be configured to include a receiver and a transmitter interface used to communicate with one or more other devices over a communication network according to one or more communication protocols, such as Ethernet, TCP/IP, SONET, ATM, or the like. Network connection interface 811 may implement receiver and transmitter functionality appropriate to the communication network links (e.g., optical, electrical, and the like). The transmitter and receiver functions may share circuit components, software or firmware, or alternatively may be implemented separately.

RAM 817 may be configured to interface via bus 802 to processing circuitry 801 to provide storage or caching of data or computer instructions during the execution of software programs such as the operating system, application programs, and device drivers. ROM 819 may be configured to provide computer instructions or data to processing circuitry 801. For example, ROM 819 may be configured to store invariant low-level system code or data for basic system functions such as basic input and output (I/O), startup, or reception of keystrokes from a keyboard that are stored in a non-volatile memory. Storage medium 821 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 821 may be configured to include operating system 823, application program 825 such as a web browser application, a widget or gadget engine or another application, and data file 827. Storage medium 821 may store, for use by UE 800, any of a variety of various operating systems or combinations of operating systems.

Storage medium 821 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 821 may allow UE 800 to access computer-executable instructions, application programs or the like, stored on transitory or non-transitory memory media, to off-load data, or to upload data. An article of manufacture, such as one utilizing a communication system may be tangibly embodied in storage medium 821, which may comprise a device readable medium.

In FIG. 11, processing circuitry 801 may be configured to communicate with network 843*b* using communication subsystem 831. Network 843*a* and network 843*b* may be the same network or networks or different network or networks. Communication subsystem 831 may be configured to include one or more transceivers used to communicate with network 843*b*. For example, communication subsystem 831 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 833 and/or receiver 835 to implement transmitter or receiver functionality, respectively, appropriate to the RAN links (e.g., frequency allocations and the like). Further, transmitter 833 and receiver 835 of each transceiver may share circuit components, software or firmware, or alternatively may be implemented separately.

In the illustrated embodiment, the communication functions of communication subsystem 831 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 831 may include cellular communication, Wi-Fi communication, Bluetooth communication, and GPS communication. Network 843*b* may encompass wired and/or wireless networks such as a local-area network (LAN), a wide-area network (WAN), a computer network, a wireless network, a telecommunications network, another like network or any combination thereof. For example, network 843*b* may be a cellular network, a Wi-Fi network, and/or a near-field network. Power source 813 may be configured to provide alternating current (AC) or direct current (DC) power to components of UE 800.

The features, benefits and/or functions described herein may be implemented in one of the components of UE 800 or partitioned across multiple components of UE 800. Further, the features, benefits, and/or functions described herein may be implemented in any combination of hardware, software or firmware. In one example, communication subsystem 831 may be configured to include any of the components described herein. Further, processing circuitry 801 may be configured to communicate with any of such components over bus 802. In another example, any of such components may be represented by program instructions stored in memory that when executed by processing circuitry 801 perform the corresponding functions described herein. In another example, the functionality of any of such components may be partitioned between processing circuitry 801 and communication subsystem 831. In another example, the non-computationally intensive functions of any of such components may be implemented in software or firmware and the computationally intensive functions may be implemented in hardware.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In summary, one part of the solution of the present disclosure requires that the wireless device or UE is able to determine and keep in its memory positions of soft bits in a soft-buffer, corresponded to received transmission. Every time before adding received soft-bits into the soft-buffer (before combining), the wireless device determines overlapping between new and already existed soft-bits. The overlapped subset of soft-bits shall be copied before combining and stored either in other special space within soft-buffer or in a separate buffer. When the wireless device receives pre-emption indicator and/or flush indicator which point to corrupted soft-bits in the soft-buffer, the wireless device is then able to flush newly received soft-bits and restore soft-bits from overlapped subset.

Another part of the solution covers scheduling aspects in case of MU-MIMO and possible UE behaviour at different available pre-emption information.

In general, the embodiments of the present disclosure include:
Receive (re)transmission
In soft buffer find positions overlapping between non-zero soft-buffer bits and received (re)transmission bits
Form a "backup": either copy overlapped bits from soft-buffer or copy overlapped bits from received (re) transmission
Combine soft-buffer with received (re)transmission
Optionally:
   Receive pre-emption indicator
   Determine a "PI-pointed subset" of affected bits in soft-buffer based on received pre-emption indicator
   If only PI is configured, flush and/or restore soft bits in soft-buffer
Receive flush indicator
If FI positive,
   determine a "FI-pointed subset" of affected bits in soft-buffer based on received flush indicator.
   If "PI-pointed subset" exist, determine intersections between PI-pointed and FI-pointed subsets
   Flush and/or restore affected soft bits in soft-buffer
Optionally:

If FI negative, do not flush and/or restore based on PI

There are, proposed herein, various embodiments which address one or more of the issues disclosed herein.

Certain embodiments may provide one or more of the following technical advantages. The solution enables graceful localizing of negative impact from pre-emption, when only some of the affected soft-bits are flushed and other soft-bits are restored. The solution of the disclosure also has the advantage that pre-emption indication is flexible and efficient. The solution can be used in pre-emption scenarios where a large portion of the UEs in the group are affected by the pre-emption, as well as in scenarios where only a smaller portion of US in the group are affected. The solution can also be used in scenarios where the pre-emption affects UEs vay for each transmission occasion. For example, in a digital beamforming and MU-MIMO scenario a pre-emption may occur to eMBB UE when a URLLC UE is scheduled. But if the URLLC UE is relatively close to the network node, only those eMBB UEs with beams interfering with the URLLC UE need to be pre-empted. However, if the URLLC UE is further away from the network node the whole transmit power may be needed to be allocated to the URLLC UE (i.e., all eMBB UEs become pre-empted).

Some further example embodiments are grouped and listed below.

Group A Embodiments

1. A method performed by a wireless device for soft-buffer handling, the method comprising:
   Receive a retransmission
   Identifying overlapping positions for non-zero bits in a soft buffer and received retransmission bits
   Copy and Store identified overlapping non-zero bits or received retransmission bits
   Combine soft-buffer with received retransmission.
2. The method of embodiment 1 further comprising the steps of:
   receiving pre-emption indicator
   determine a "PI-pointed subset" of affected bits in soft-buffer based on received pre-emption indicator
   flush and/or restore soft-bits in soft-buffer if only PI is configured.
3. The method of embodiment 1 or 2, further comprising the step of receiving a flush indicator.
4. The method of embodiment 3, further comprising the steps of:
   if FI is positive, determine a "FI-pointed subset" of affected bits in soft-buffer based on received flush indicator,
   if P I-pointed subset exists, determined intersections between P I-pointed and FI-pointed subsets,
   flush and/or restore affected soft bits in soft-buffer.
5. The method according to embodiment 3, further comprising the step of:
   if FI is negative, do not flush and/or restore based on PI.
6. The method according to any of the previous embodiments, wherein said wireless device stores said overlapping non-zero bits or received retransmission bits in an allocated part of the soft-buffer or in a separate buffer or memory.
7. The method according to embodiment 6, wherein said part of said soft-buffer is temporarily, statically, or semi-statically allocated.
8. The method of any of the previous embodiments, further comprising:
   providing user data; and
   forwarding the user data to a host computer via the transmission to the base station.

Group B Embodiments

9. A method performed by a base station for supporting soft-buffer handling, the method comprising:
   Transmitting or retransmitting an initial transmission to a wireless device,
   Transmitting a pre-emption indicator to said wireless device,
   Transmitting a flush-indicator to said wireless device.
10. The method of any of the previous embodiments, further comprising:
    obtaining user data; and
    forwarding the user data to a host computer or a wireless device.

Group C Embodiments

11. A wireless device for soft-buffer handling the wireless device comprising:
    processing circuitry configured to perform any of the steps of any of the Group A embodiments; and
    power supply circuitry configured to supply power to the wireless device.
12. A base station for supporting soft-buffer handling, comprising
    processing circuitry configured to perform any of the steps of any of the Group B embodiments; and
    power supply circuitry configured to supply power to the base station.
13. A user equipment (UE) for soft-buffer handling, the UE comprising:
    an antenna configured to send and receive wireless signals;
    radio front-end circuitry connected to the antenna and to processing circuitry, and configured to condition signals communicated between the antenna and the processing circuitry;
    the processing circuitry being configured to perform any of the steps of any of the Group A embodiments;
    an input interface connected to the processing circuitry and configured to allow input of information into the UE to be processed by the processing circuitry;
    an output interface connected to the processing circuitry and configured to output information from the UE that has been processed by the processing circuitry; and
    a battery connected to the processing circuitry and configured to supply power to the UE.

The invention claimed is:

1. A method for soft buffer handling in a user equipment in a wireless communication system, wherein said method comprises the steps of:
   receiving, by the user equipment, a transmission from a network node, the transmission comprising received soft values;
   identifying overlapping positions for non-zero soft values in a soft buffer and the received soft values;
   copying and storing, in an allocated part of the soft buffer or in a separate buffer or memory, the identified overlapping non-zero soft values or the identified overlapping received soft values; and
   combining one or more of the non-zero soft values in said soft buffer with one or more of the received soft values of said received transmission.

2. The method according to claim 1, comprising further steps of:
- receiving a pre-emption indicator (PI);
- determining a PI-pointed subset of affected soft values in said soft buffer based on said received PI; and
- flushing and/or restoring soft values in said soft buffer.

3. The method according to claim 1, further comprising a step of receiving a flush indicator (FI).

4. The method according to claim 3, wherein
- if the received FI is positive, determining a FI-pointed subset of affected soft values in said soft buffer based on said received FI;
- if a pre-emption indicator (PI)-pointed subset of affected soft values in said soft buffer exists, determining intersections between said PI-pointed subset and said FI-pointed subset; and
- flushing and/or restoring affected soft values in said soft buffer.

5. The method according to claim 3, wherein if said FI is negative, abstaining from flushing and/or restoring affected soft values based on a pre-emption indicator (PI).

6. The method according to claim 1, wherein said part of said soft buffer or said separate buffer or memory is temporarily, statically or semi-statically allocated.

7. The method according to claim 1, wherein said transmission is a re-transmission.

8. The method according to claim 1, wherein said soft values comprise bits.

9. A computer program comprising instructions, which when executed by at least one processor circuitry, cause the at least one processor circuitry to perform the steps of claim 1.

10. A wireless device for soft-buffer handling, the wireless device being configured to:
- receive, by the wireless device, a transmission from a network node, the transmission comprising received soft values;
- identify overlapping positions for non-zero soft values in a soft buffer and the received soft values;
- copy and store, in an allocated part of the soft buffer or in a separate buffer or memory, the identified overlapping non-zero soft values or the identified overlapping received soft values; and
- combine one or more of the non-zero soft values in said soft buffer with one or more of the received soft values of said received transmission.

11. The wireless device according to claim 10, wherein said wireless device is further configured to:
- receive a pre-emption indicator (PI);
- determine a PI-pointed subset of affected soft values in soft buffer based on said received PI; and
- flush and/or restore soft values in said soft buffer.

12. The wireless device according to claim 10, said wireless device being further configured to receive a flush indicator (FI).

13. The wireless device according to claim 12, wherein said wireless device is configured to:
- if the received FI is positive, determine a FI-pointed subset of affected soft values in said soft buffer based on said received FI;
- if a pre-emption indicator (PI)-pointed subset of affected soft values in said soft buffer exists, determine intersections between said PI-pointed subset and said FI-pointed subset; and to
- flush and/or restore affected soft values in said soft buffer.

14. The wireless device according to claim 12, wherein if said received FI is negative, the wireless device is configured to abstain from flushing and/or restoring affected soft values based on a pre-emption indicator (PI).

15. The wireless device according to claim 10, wherein said part of said soft buffer is temporarily, statically or semi-statically allocated.

16. The wireless device according to claim 10, wherein said transmission is a re-transmission.

17. The wireless device according to claim 10, wherein said soft values comprise bits.

18. The wireless device of claim 10, wherein the wireless device comprises processor circuitry and a memory, said memory comprising instructions executable by the processor circuitry, whereby the processor circuitry is operative to cause the wireless device to perform claim 10.

* * * * *